No. 697,441. Patented Apr. 15, 1902.
W. S. BROOKS.
APPARATUS FOR EQUIPPING VEHICLE WHEELS WITH TIRES OF RUBBER OR OTHER ELASTIC MATERIAL.
(Application filed May 20, 1901.)
(No Model.) 2 Sheets—Sheet 1.
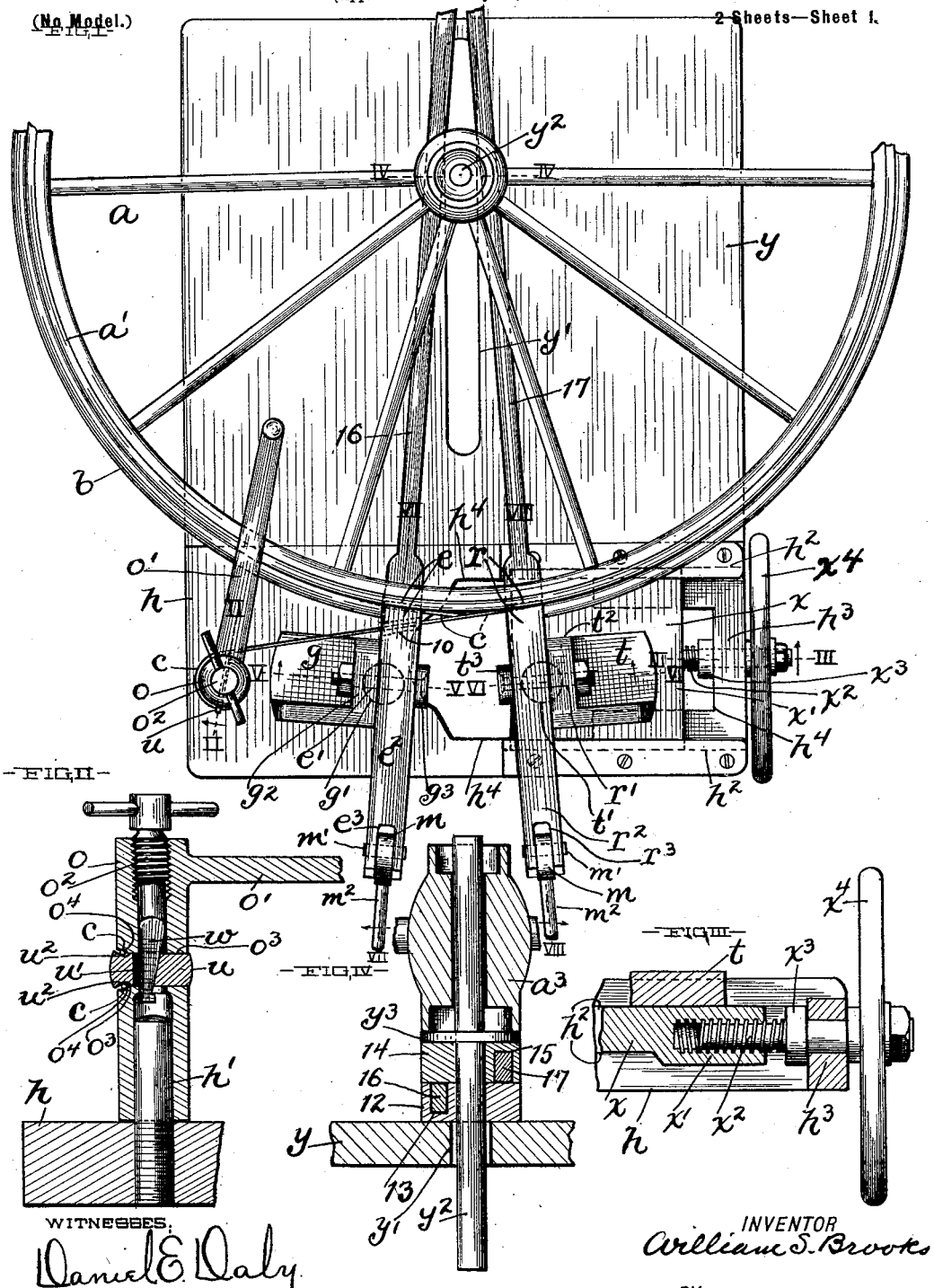
WITNESSES:
Daniel E. Daly
A. H. Parratt
INVENTOR
William S. Brooks
BY Lynch & Dorer
his ATTORNEYS

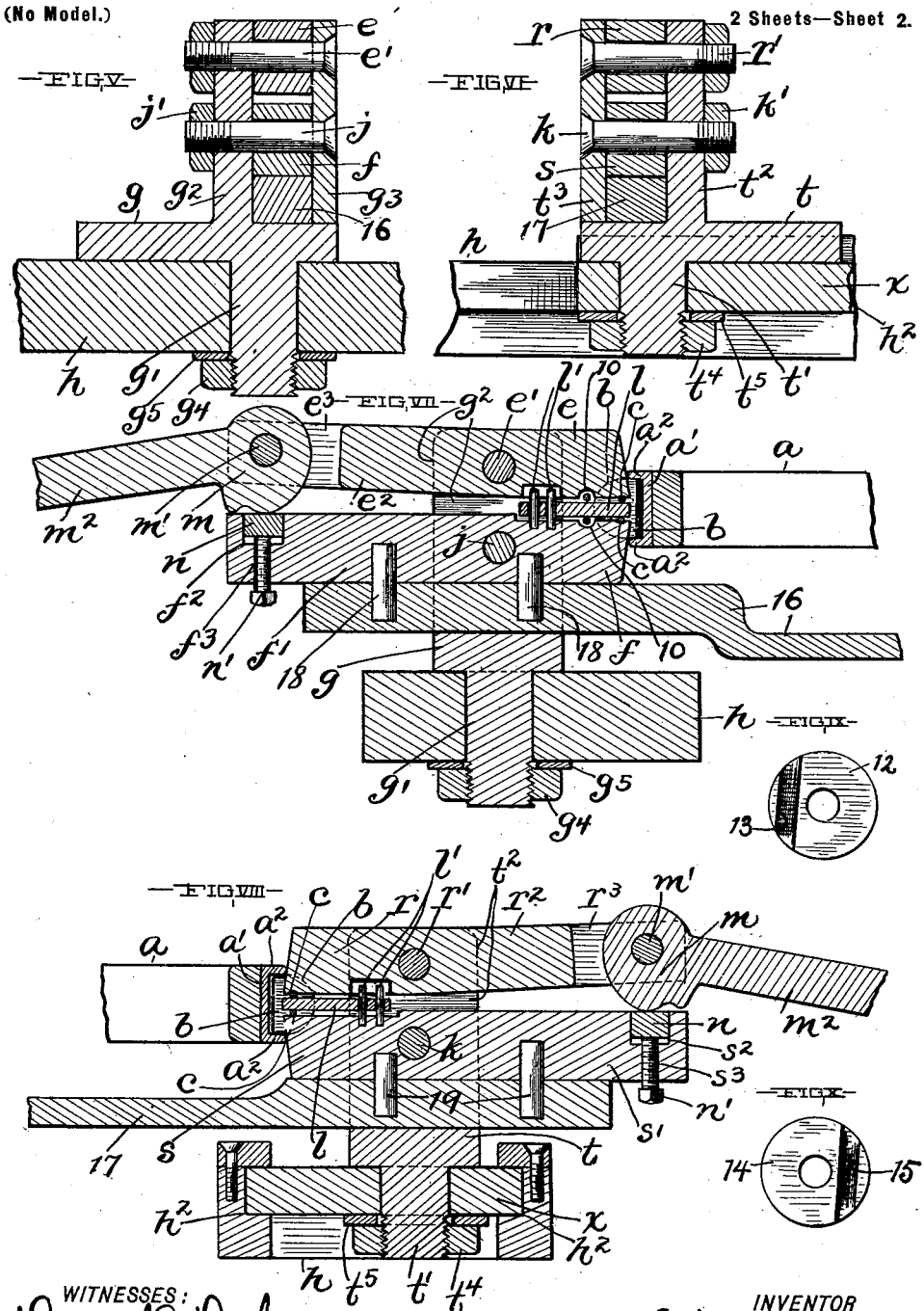

UNITED STATES PATENT OFFICE.

WILLIAM S. BROOKS, OF AKRON, OHIO.

APPARATUS FOR EQUIPPING VEHICLE-WHEELS WITH TIRES OF RUBBER OR OTHER ELASTIC MATERIAL.

SPECIFICATION forming part of Letters Patent No. 697,441, dated April 15, 1902.

Application filed May 20, 1901. Serial No. 61,110. (No model.)

*To all whom it may concern:*

Be it known that I, WILLIAM S. BROOKS, a resident of Akron, in the county of Summit and State of Ohio, have invented certain new and useful Improvements in Apparatus for Equipping Vehicle-Wheels with Tires of Rubber or other Elastic Material; and I do hereby declare the following to be a full, clear, and exact description of the invention, such as will enable others skilled in the art to which it pertains to make and use the same.

My invention relates to improvements in apparatus for equipping a vehicle-wheel with a tire of rubber or other elastic material, which is held in place on the periphery of the wheel by an endless band or bands which pass through the rubber or elastic body circumferentially of the wheel.

The object of this invention is to provide apparatus of the character indicated which is simple in construction, conveniently operated, reliable in its operation, and well adapted for use in the tire equipment of wheels varying in diameter.

With this object in view and to the end of realizing other advantages hereinafter appearing my invention consists in certain features of construction and combinations of parts hereinafter described, and pointed out in the claims.

In the accompanying drawings, Figure I is a top plan of apparatus embodying my invention, and portions are broken away in this figure to reduce the size of the drawing. Fig. II is an elevation in detail, largely in section on line II II, Fig. I, illustrating the winding-drum for tightening the retaining band or bands of a tire which is to be applied to the rim of a vehicle-wheel and illustrating the operation of the means employed in securing the said band or bands to the drum. Fig. III is an elevation in detail, mostly in section on line III III, Fig. I, looking in the direction indicated by the arrow. Fig. IV is an elevation in detail, mostly in section on line IV IV, Fig. I, looking in the direction indicated by the arrow. Figs. V, VI, VII, and VIII are vertical sections on lines V V, VI VI, VII VII, and VIII VIII, respectively, Fig. I, looking in the direction indicated by the arrows. Fig. IX is a top plan of the lower disk or collar 12. Fig. X is a bottom plan of the upper disk or collar 14.

The parts illustrated in the figures from II to X, inclusive, are drawn on a larger scale than in Fig. I.

Referring to the drawings, $a$ represents a vehicle-wheel which is to be equipped with a rubber or elastic tire by apparatus embodying my invention. $a'$ designates the metal rim with which the said wheel is provided, and $b$ represents the elastic tire which is to encircle the rim and to be secured in position between the circumferentially-extending flanges $a^2$ and $a^2$, with which the rim $a'$ is provided. The retaining band or bands $c$ and $c$, employed in holding the tire upon the rim $a'$, are made, preferably, of wire and passed through the tire circumferentially of the wheel. Preferably two bands $c$ and $c$ are employed in holding the tire upon the rim and extend through the inner portion of the tire a suitable distance apart widthwise of the rim. The work which is to be done by my improved apparatus is to spread apart opposite ends of the tire, to firmly hold the bands $c$ at one end, then to pull upon the opposite end of the bands, then to firmly clamp the last-mentioned end of the bands preparatory to the trimming of the last-mentioned end, and securing opposite ends of each band together, so as to form an endless band, whereupon the ends and the tire through which the bands pass are released, so as to permit the separated ends of the tire to come together.

Any means for supporting the wheel to be equipped with a tire may be employed, although I have devised improved means for supporting the wheel, as will hereinafter appear.

My improved apparatus comprises clamping means for tightly holding the bands $c$ and $c$ at one end while the said bands are tightened and has other clamping means for clamping the said bands at the other end when the bands have been placed under the requisite tension preparatory to the welding or securing together of opposite ends of the bands.

The clamping means for holding the retaining-bands $c$ and $c$ at one end preparatory to tightening the said bands by pulling upon their other ends comprises, preferably, a pair of clamping-jaws $e$ and $f$, arranged one above the other externally of and approximately radially to the wheel which is to be equipped with the tire. The said jaws $e$ and $f$ are (see Figs. V and VII) carried by a plate $g$, which is provided upon its under side with a depending vertical cylindrical lug $g'$, which has bearing in the stationary bed $h$ of the machine. The jaw-bearing plate $g$ is therefore swiveled to or pivotally mounted upon the bed $h$ and capable of oscillating in a horizontal plane and is provided with two upwardly-projecting members $g^2$ and $g^3$, arranged at opposite sides, respectively, of the jaws. Preferably member $g^2$ is integral with the plate $g$, and member $g^3$ mounted upon the said plate $g$. The upper jaw $e$ is pivoted horizontally, as at $e'$, to and between the members $g^2$ and $g^3$. The lower jaw $f$ is rigidly clamped between the said members $g^2$ and $g^3$ by means of a bolt $j$ and nut $j'$ or in any other approved manner. The pivot $e'$ of the upper jaw $e$ is formed by a bolt; but this jaw is never clamped between the members $g^2$ and $g^3$. The lug $g'$ extends downwardly through the bed $h$ and is screw-threaded at its lower end below the bed. The lug $g'$ forms, therefore, a stud, and a correspondingly-threaded nut $g^4$ is mounted upon this stud under the bed, and a washer $g^5$ is interposed between the nut and the bed. The nut $g^4$ is not tightened against the bed, but only prevents displacement of the plate $g$ and the jaws $e$ and $f$, carried by the said plate, upwardly from the bed without interfering with the capability of the said plate to swing or oscillate in a horizontal plane upon the bed.

To enable the clamping-jaws $e$ and $f$ to operate simultaneously upon the two tire-retaining bands $c$ and $c$, a clamping-plate $l$ is interposed between the opposing faces of the two jaws and held in place laterally by two vertically-arranged pins $l'$, set in the lower jaw $f$ and loosely extending through the plate $l$, and the upper jaw $e$ is suitably recessed to accommodate the location of the said pins. The plate $l$ is movable up and down the pins $l'$ and can be removed upon lifting the upper jaw $e$ after a removal of the pivot $e'$.

Means for rendering the upper jaw $e$ operative or inoperative by tilting it toward or from the companion and stationary jaw $f$ is provided and comprises, preferably, an eccentric $m$, which is arranged within a slot or recess $e^3$, formed vertically and longitudinally in the outer end of the arm $e^2$ of the jaw $e$. The eccentric $m$ is pivoted horizontally, as at $m'$, to and transversely of the said arm. The lower jaw $f$ is formed by one end of a bar $f'$, which extends underneath and longitudinally of the arm $e^2$ of the upper jaw $e$, is under and is arranged to be borne upon by the eccentric $m$, and the arrangement of parts is such that the upper jaw $e$ is tilted toward the lower jaw $f$, and thereby rendered operative, or farther separated from the said jaw $f$, and thereby rendered inoperative, according as the eccentric by a proper manipulation of the lever $m^2$, with which the eccentric is provided, is turned in the one or the other direction. The bar $f'$ is provided next below the sweep of the eccentric $m$ with a block $n$, of hard steel or other durable material, and this block $n$ has its upper side engaged by the peripheral surface of the eccentric. The block $n$ is movable up and down a recess $f^2$, with which the jaw-bar $f'$ is provided, and rests upon the upper end of a vertically-arranged screw $n'$, which engages a correspondingly-arranged and correspondingly-threaded hole $f^3$, formed in the lower wall or bottom of the said recess. Obviously the block $n$ lowers by gravity or is elevated, according as the screw $n'$ is turned in the one direction or the other, and the throw of the eccentric will be greater or less, according as the block $n$ is raised or lowered. Obviously the arm $e^2$ of the upper jaw is heavy enough to tilt downwardly by gravity upon rendering the eccentric $m$ inoperative, and thereby to elevate or separate the said jaw $e$ from the jaw $f$. It will be observed also that my improved means for operating the upper jaw is exceedingly simple and durable, and no spring or other additional device is required to separate the jaw $e$ from the jaw $f$ upon the rendering of the eccentric inoperative.

The two tire-retaining bands $c$ and $c$ pass from a point centrally between the clamping means comprising the jaws $e$ and $f$ and the clamping means comprising the jaws $r$ and $s$, hereinafter described, to and between the jaws $e$ and $f$ into one end of the tire and thence through and circumferentially of the tire out at the opposite end of the tire to and between the jaws $r$ and $s$. One of the bands $c$ extends transversely of and between the jaw $e$ and the upper surface of the plate $l$, and the other band $c$ extends transversely of and between the said plate $l$ and the face of the jaw $f$. By this construction both bands $c$ are obviously simultaneously clamped or released, according as the upper jaw $e$ is during the operation of the eccentric $m$ tilted to the required extent toward or from the lower jaw $f$. If the tire is provided with only one tire-retaining band $c$, a removal of the plate $l$ from between the jaws $e$ and $f$ is effected and the eccentric-engaging block $n$ readjusted to increase the throw of the eccentric and enable the upper jaw $e$ to operate upon the single band, which would then obviously be directly engaged by both jaws $e$ and $f$ upon being clamped between the said jaws.

The jaws $r$ and $s$ are arranged at the right-hand side of and a suitable distance from the jaws $e$ and $f$, respectively, and are constructed and operated as will hereinafter appear. The bands $c$ extend from the jaws $r$ and $s$ loosely through recesses 10, formed in the opposing faces of the jaws $e$ and $f$, to the band-tightening winding-drum $o$, to which the bands are secured, as will hereinafter appear. The drum $o$ (see Figs. II and III) is arranged vertically at and a suitable distance from the outer end of the jaw-bearing plate $g$ and rests upon the bed $h$. The drum $o$ is tubular and has the lower end thereof turnably embracing a correspondingly vertically-arranged cylindrical lug or stud $h'$, which projects upwardly from and is rigid with the bed $h$. The drum $o$ is provided at its upper end with a hand-lever $o'$ for turning the same. The drum $o$ is provided internally of its upper portion with a vertically-arranged screw $o^2$, which engages corresponding threads formed upon the surrounding wall of the upper end of the bore extending through the drum. The screw $o^2$ has its lower end engaging the upper and larger end of a wedge $w$, which is contained within the central portion of the bore of the drum and arranged with its smaller end lowermost. The wedge $w$ extends through a vertical slot $u'$, formed in a horizontally-arranged pin or member $u$, which extends transversely of and through the drum $o$ and is shiftable endwise, and the surrounding wall of the bore of the drum has two oppositely-arranged and registering lateral apertures or holes $o^3$ to accommodate the location and operation of the said pin $u$. One of the pin-engaging holes $o^3$ has its outer end enlarged top and bottom to form two outwardly-facing shoulders $o^4$ and $o^4$, engaged by the different bands $c$ and $c$, respectively, and the pin $u$ has two inwardly-facing shoulders $u^2$ and $u^2$, arranged opposite the shoulders $o^4$ and $o^4$ in position to clamp the bands against the said shoulders $o^4$ and $o^4$. The arrangement of the parts is such that the pin $u$ is actuated endwise in the direction required to cause the shoulders $u^2$ of the pin to clamp the bands $c$ against the shoulders $o^4$ of the drum, when the wedge $w$ is lowered by turning the screw $o^2$ in the direction required.

The clamping means for holding the retaining-bands in their tightened position after the operation of the band-tightening drum $o$ and comprising the jaws $r$ and $s$ is substantially the same in construction as the clamping means already described for holding the bands at one end preparatory to placing the bands under tension. The jaws $r$ and $s$ are arranged externally of and approximately radially to the wheel which is to be equipped with the tire. The pairs of jaws $e\,f$ and $r\,s$ are arranged a suitable distance apart laterally, as already indicated, and converge toward the axis of the wheel. The jaws $r$ and $s$ (see Figs. VI and VIII) are arranged one above the other and are carried by a plate $t$, which is provided upon its under side with a depending vertically-arranged cylindrical stud-forming lug $t'$, which has bearing in the slide $x$. The plate $t$ is therefore pivotally mounted upon the slide $x$ and is capable of oscillating or swinging in a horizontal plane, having two upwardly-projecting members $t^2$ and $t^3$ arranged at opposite sides, respectively, of the jaws. Preferably the member $t^2$ is integral with the plate $t$, and member $t^3$ is mounted upon the said plate. The upper jaw $r$ is pivoted horizontally, as at $r'$, to and between the members $t^2$ and $t^3$ of the plate $t$, and the lower jaw $s$ is clamped between the said members $t^2$ and $t^3$ by means of a suitably-applied bolt $k$ and nut $k'$. The pivot $r'$ of the jaw $r$ is shown formed by a bolt. The stud $t'$ extends through the slide $x$. A nut $t^4$ is mounted upon the stud $t'$ below the slide $x$, and a washer $t^5$ is interposed between the nut and the slide. The nut $t^4$ is not tightened against the slide $x$, but only prevents displacement of the plate $t$ and the jaws $r$ and $s$, carried by the said plate, upwardly from the slide without interfering with the capability of the said plate to swing or oscillate in a horizontal plane upon the slide.

To enable the clamping-jaws $r$ and $s$ to operate simultaneously upon the two tire-retaining bands $c$ and $c$, a clamping-plate $l$ is provided and interposed between the opposing faces of the said jaws and held in place laterally by two vertically-arranged pins $l'$, set in the lower jaw $s$ and loosely extending through the said plate $l$, and the upper jaw $r$ is suitably recessed to accommodate the location of the said pins. The said plate $l$ is movable up and down the said pins $l'$ and can be removed upon lifting the upper jaw $r$ after a removal of the pivot $r'$.

The means employed for rendering the upper jaw $r$ operative or inoperative by tilting it toward or from the companion and stationary jaw $s$ is substantially the same as the means already described in connection with the operation of the jaws $e$ and $f$, comprising an eccentric $m$, which is arranged within a slot or recess $r^3$, formed vertically and longitudinally in the outer end of the arm $r^2$ of the jaw $r$. The said eccentric $m$ is pivoted horizontally, as at $m'$, to and transversely of the said arm $r^2$. The lower jaw $s$ is formed by one end of a bar $s'$, which extends underneath and longitudinally of the arm $r^2$ of the upper jaw $r$ is under and is arranged to be borne upon by the said eccentric $m$, and the arrangement of parts is such that the upper jaw $r$ is tilted toward the lower jaw $s$, and thereby rendered operative, or separated farther from the said jaw $s$, and thereby rendered inoperative, according as the eccentric by a proper manipulation of the lever $m^2$, with which the eccentric is provided, is turned in the one direction or the other. The bar $s'$ is provided next below the sweep of the eccentric with a block $n$, of hard steel or durable material, and this block $n$ is engaged by the peripheral surface of the eccentric. The said block $n$ is movable up and down a recess $s^2$, with which the jaw-bar $s'$ is provided, and rests upon the upper end of a vertically-arranged screw $n'$, which engages a correspondingly-arranged and correspondingly-threaded hole $s^3$, formed in the lower wall or bottom of the said recess. Obviously the said block $n$ lowers by gravity or is elevated, according as the engaging screw $n'$ is turned in the one direction or the other, and the throw of the eccentric will be greater or less, according as the said block $n$ is raised or lowered. One of the bands $c$ extends transversely of and between the jaw $r$ and the upper surface of the plate $l$, interposed between the jaws $r$ and $s$, and the other band $c$ extends transversely of and between the said plate $l$ and jaw $s$, and by this construction both bands $c$ are obviously simultaneously clamped or released between the jaws $r$ and $s$, according as the upper jaw $r$ is during the operation of its eccentric $m$ tilted to the required extent toward or from the lower jaw $s$. If the tire is provided with only one tire-retaining band $c$, a removal of the plate $l$, interposed between the jaws $r$ and $s$, is effected and the block $n$ of the jaw-bar $s'$ readjusted to increase the throw of the eccentric and enable the upper jaw $r$ to operate upon the single band, which obviously would then be directly engaged by both jaws $r$ and $s$ upon being clamped between the said jaws.

The slide $x$ (see Figs. I, III, and VIII) is arranged to move horizontally toward and from the pair of jaws $e$ and $f$, engaging correspondingly-arranged slideways or guides $h^2$, with which the bed $h$ is provided. The slide $x$ has its outer end, forming a nut $x'$, arranged lengthwise of the slide and engaged by a correspondingly-threaded screw $x^2$, which has bearing in a box $h^3$, formed upon the bed $h$, which is cut away or slotted, as at $h^4$, below the path of the slide $x$ from the inner end of the box $h^3$ to and a suitable distance beyond the inner end of the said path. The screw $x^2$ is provided next adjacent to the inner end of the box $h^3$ with a collar $x^3$, and a hand-wheel $x^4$ is fixed upon the screw and has its hub engaging the outer end of the said box $h^3$. The hub of the wheel $x^4$ and the collar $x^3$ render the screw $x^2$ stationary so far as endwise movement of the screw during the rotation of the screw is concerned. Obviously by the construction hereinbefore described the slide $x$ and the jaws $r$ and $s$, carried by the said slide, are moved toward or from the jaws $e$ and $f$, according as the screw $x^2$ is rotated in the one or the other direction, and hence the distance between the clamping means comprising the jaws $e$ and $f$ and the clamping means comprising the jaws $r$ and $s$ can be enlarged or decreased to render the distance apart of the two clamping means most advantageous to the work to be done and to accommodate the trimming of the ends of the bands $c$ when the same have been tightened as required preparatory to welding or securing together the ends of each band.

The wheel which is to be equipped with a tire is supported (see Figs. I and IV) from a table $y$, which abuts against the rear edge of the bed $h$. The table $y$ is provided centrally with a slot $y'$, which extends forwardly and rearwardly and is arranged at right angles to the travel of the slide $x$. A vertically-arranged stem $y^2$ extends through the slot $y'$ and a suitable distance above the table $y$. Two disks 12 and 14 loosely embrace and are turnable upon the stem $y^2$ and arranged one above the other. The lower disk 12 rests directly upon the table $y$, and the upper disk 14 rests upon the disk 12. The stem $y^2$ next above the upper disk 12 has a collar $y^3$, and the wheel $a$ rests at its hub $a^3$ upon the collar $y^3$. Two open-ended recesses 13 and 15 are formed in the opposing faces of the disks 12 and 14, respectively, at opposite sides, respectively, of the stem $y^2$, and two bars 16 and 17 extend through the different recesses 13 and 15, respectively. The bar 16 extends in under the jaw-bar $f'$, (see Figs. V and VII,) between the said bar $f'$ and the plate $g$. Endwise displacement of the bar 16 is prevented by pins 18, which engage registering holes or recesses formed in the opposing sides of the bars 16 and $f'$. The bar 17 extends in under and longitudinally of the jaw-bar $s'$, (see Figs. VI and VIII,) between the said bar $s'$ and the plate $t$, and pins 19, which engage registering holes or recesses formed in the opposing sides of the said bars $s'$ and 17, prevent endwise displacement of the bar 17.

It is desirable that the clamping-jaws $e$ $f$ and $r$ $s$ shall at all times be rendered as nearly radially as possible relative to the axis of the wheel which is to be equipped with the tire, and the importance, therefore, of having the said jaws carried by plates $g$ and $t$ capable of swinging or oscillating in a horizontal plane is obvious. The stem $y^2$ and the disks or collars 12 and 14 form a wheel-carriage for bearing the wheel which is to be equipped with a tire, which carriage is slidable or adjustable upon the table $y$, along the slot $y'$ in the said table, and the side walls of the said slot, engaging the stem or member $y^2$ of the said carriage, form means for guiding the carriage. The capability of the disks or collars 12 and 14 to turn in a horizontal plane and the capability of the plates $g$ and $t$ to oscillate in a horizontal plane and the connection between the plates $g$ $t$ and the collars 12 and 14 by the bars 16 and 17, respectively, enable the proper arrangement of the clamping means carried by the said plates $g$ and $t$ at all times and automatically relative to the wheel which is to be equipped with the tire. I would have it understood, however, that my invention embraces, broadly, any construction whereby the plates $g$ and $t$ are oscillated in opposite directions and actuated simultaneously during the shifting of the wheel-carriage relative to the clamping apparatus of the said plates.

What I claim is—

1. A machine of the character indicated, the combination with a winding-drum having a bore formed therein and extending longitudinally of the drum, of an endwise-shiftable pin or member $u$ extending transversely of the drum and having bearing in opposite walls of the bore and provided with an inwardly-facing shoulder $u^2$ arranged to clamp the tire-retaining wire to the drum, and means for shifting the said endwise-shiftable member, substantially as and for the purpose set forth.

2. In a machine of the character indicated, the combination, with a suitably-supported upright winding-drum having a hole or bore formed therein and extending longitudinally of the drum, and provided with two oppositely-arranged and registering apertures or holes $o^3$ and $o^3$ formed in the surrounding wall of the said bore, of an endwise-shiftable pin or member $u$ extending transversely of the drum and engaging the said holes $o^3$ and $o^3$ and provided with an inwardly-facing shoulder $u^2$ arranged to clamp a tire-retaining wire to the drum, and means for shifting the said endwise-shiftable member, substantially as and for the purpose set forth.

3. In a machine of the character indicated, a winding-drum having a bore formed therein and extending longitudinally of the drum, of an endwise-shiftable pin or member $u$ extending transversely of and having bearing within the drum and provided with an inwardly-facing shoulder $u^2$ arranged to clamp the tire-retaining wire to the drum, a wedge extending through and transversely of the said endwise-shiftable member, a screw within the aforesaid bore of the drum in position to operate the wedge, and screw-threads formed upon the surrounding wall of the said bore and engaged by the screw, substantially as and for the purpose set forth.

4. In a machine of the character indicated, the combination, with a suitably-supported upright winding-drum having a bore or hole extending from its upper end downwardly, screw-threads formed upon the upper portion of the surrounding wall of the said bore, two oppositely-arranged and registering lateral apertures or holes $o^3$ and $o^3$ formed in the said wall below the aforesaid threads, and an outwardly-facing shoulder $o^4$ formed upon the surrounding wall of one of the said lateral holes or apertures, of an endwise-shiftable pin or member $u$ extending transversely of the drum and engaging the said holes $o^3$ and $o^3$ and provided with a vertical slot $u'$ and an inwardly-facing shoulder $u^2$ opposite the aforesaid shoulder $o^4$, a wedge $w$ extending through the slot in the endwise-shiftable member and arranged with its smaller end lowermost, and a screw engaging the aforesaid threads and arranged to operate the wedge, all arranged and operating substantially as shown, for the purpose specified.

5. In a machine of the character indicated, the combination, with a supporting-bed $h$ provided with a vertically-arranged stud $h'$, and a vertically-arranged tubular winding-drum having its lower end embracing the said stud and having screw-threads formed upon the upper portion of the surrounding wall of its bore, the two oppositely-arranged and registering lateral apertures or holes $o^3$ and $o^3$, and the two outwardly-facing shoulders $o^4$ and $o^4$ arranged at the top and bottom, respectively, of one of the said lateral apertures or holes, of an endwise-shiftable pin or member $u$ extending transversely of the drum and engaging the said holes $o^3$ and $o^3$ and provided with a vertical slot $u'$ and two inwardly-facing shoulders $u^2$ and $u^2$ formed at the top and bottom, respectively, of the said endwise-shiftable member and arranged to clamp the tire-retaining bands against the aforesaid shoulders $o^4$ and $o^4$, a wedge $w$ extending through the slot in the endwise-shiftable member and arranged with its smaller end lowermost, and a screw engaging the aforesaid threads of the surrounding wall of the bore of the drum and arranged to operate the wedge, substantially as and for the purpose set forth.

6. In a machine of the character indicated, two clamping mechanisms arranged a suitable distance apart laterally and adapted to clamp opposite ends, respectively, of a tire-retaining band or bands; two plates carrying the different clamping mechanisms, respectively, and capable of oscillating or swinging in a horizontal plane; a wheel-carriage arranged between and a suitable distance from the axes of the aforesaid plates and shiftable toward and from the said plates, and means whereby the said plates are automatically actuated in opposite directions, respectively, during the shifting of the wheel-carriage toward or from the said plates, and the arrangement of the parts being such that the two clamping mechanisms are caused to approach or recede from each other according as the wheel-carriage is shifted toward or from the aforesaid plates, substantially as and for the purpose set forth.

7. In a machine of the character indicated, two clamping mechanisms arranged a suitable distance apart laterally and adapted to clamp opposite ends, respectively, of a tire-retaining band or bands; two plates $g$ and $t$ carrying the different clamping mechanisms, respectively, and supported so as to render them capable of oscillating or swinging in a horizontal plane; a wheel-carriage arranged between and a suitable distance from the axes of the aforesaid plates and comprising two disks 12 and 14 arranged one above the other with open-ended recesses 13 and 15 formed in the opposing faces of the disks 12 and 14, respectively, and bars 16 and 17 engaging the recesses 13 and 15, respectively, and attached to the aforesaid plates $g$ and $t$, respectively, substantially as and for the purpose set forth.

8. A machine of the character indicated, comprising a table; two suitably-supported rotary disks 12 and 14 shiftable forwardly and rearwardly upon the said table and having, respectively, the open-ended recesses 13 and 15 formed in their opposing faces at opposite sides, respectively, of the axes of the disks; a bed $h$ arranged forwardly of the aforesaid table; a plate $g$ swiveled or pivotally mounted upon the said bed and arranged to swing or oscillate in a horizontal plane; clamping means carried by the said plate; the slide $x$ movable toward and from the plate $g$; means for operating the slide; a plate $t$ swiveled or pivotally mounted upon the slide and arranged to swing or oscillate in a horizontal plane, clamping means carried by the said plate $t$, and two bars 16 and 17 engaging the aforesaid recesses 13 and 15, respectively, and attached to the said plates $g$ and $t$, respectively, all arranged and operating substantially as shown, for the purpose specified.

9. A machine of the character indicated, comprising a horizontally-arranged table $y$ provided centrally with a forwardly and rearwardly extending slot $y'$; a vertically-arranged stem $y^2$ extending through the said slot; two disks or collars 12 and 14 turnably embracing the said stem and having, respectively, the open-ended recesses 13 and 15 formed in their opposing faces, at opposite sides, respectively, of the stem; a bed $h$ arranged forwardly of the aforesaid table; a plate $g$ swiveled or pivotally mounted upon the said bed and arranged to swing or oscillate in a horizontal plane; clamping means carried by the said plate; a slide $x$ movable toward and from the plate $g$; means for operating the slide; a plate $t$ swiveled or pivotally mounted upon the slide and arranged to swing or oscillate in a horizontal plane; clamping means carried by the said plate $t$, and two bars 16 and 17 engaging the aforesaid recesses 13 and 15, respectively, and attached to the plates $g$ and $t$, respectively, all arranged and operating substantially as shown, for the purpose specified.

10. A machine of the character indicated, comprising a horizontally-arranged table $y$ provided centrally with a forwardly and rearwardly extending slot $y'$; a vertically-arranged stem $y^2$ extending through the said slot; two disks or collars 12 and 14 loosely embracing the said stem and having, respectively, the two open-ended recesses 13 and 15, formed in their opposing faces at opposite sides, respectively, of the stem; two bars 16 and 17 engaging the recesses 13 and 15, respectively, and extending forwardly from the disks or collars; a bed $h$ arranged forwardly of the aforesaid table; a plate $g$ swiveled or pivotally mounted upon the said bed and capable of swinging or oscillating in a horizontal plane, which plate has two upright members $g^2$ and $g^3$ arranged at opposite sides, respectively, of the bar 16; clamping means over the said bar 16 between the said members $g^2$ and $g^3$ and comprising an upper jaw tiltable in a vertical plane and a relatively stationary lower jaw; means for attaching the aforesaid bar 16 to the said lower jaw; a slide $x$ movable toward and from the aforesaid plate $g$; slideways for the slide; a plate $t$ swiveled or pivotally mounted upon the slide so as to render the said plate $t$ capable of swinging or oscillating in a horizontal plane, which plate $t$ has two upright members $t^2$ and $t^3$ provided at opposite sides, respectively, of the aforesaid bar 17; clamping means over the said bar 17 between the members $t^2$ and $t^3$ and comprising an upper jaw tiltable in a vertical plane and a relatively stationary lower jaw; means for attaching the said bar 17 to the last-mentioned lower jaw, all arranged and operating substantially as shown, for the purpose specified.

Signed by me at Cleveland, Ohio, this 13th day of May, 1901.

WILLIAM S. BROOKS.

Witnesses:
C. H. DORER,
A. H. PARRATT.